United States Patent
Shimizu

(10) Patent No.: US 8,643,844 B2
(45) Date of Patent: Feb. 4, 2014

(54) LASER DISTANCE MEASURING APPARATUS WITH BEAM SWITCH

(75) Inventor: Tohru Shimizu, Tsuchiura (JP)

(73) Assignees: Tokyo Seimitsu Co., Ltd, Tokyo (JP); Tosei Engineering Corp, Ibaraki (JP)

( * ) Notice: Subject to any disclaimer, the term of this patent is extended or adjusted under 35 U.S.C. 154(b) by 936 days.

(21) Appl. No.: 11/990,327

(22) PCT Filed: May 24, 2006

(86) PCT No.: PCT/JP2006/310824
§ 371 (c)(1),
(2), (4) Date: Jul. 16, 2009

(87) PCT Pub. No.: WO2007/020738
PCT Pub. Date: Feb. 22, 2007

(65) Prior Publication Data
US 2010/0033731 A1   Feb. 11, 2010

(30) Foreign Application Priority Data
Aug. 16, 2005   (JP) .................................. 2005-235827

(51) Int. Cl.
*G01B 9/02* (2006.01)
(52) U.S. Cl.
USPC ........................................................ 356/493
(58) Field of Classification Search
USPC ................................. 356/498, 493, 486, 482
See application file for complete search history.

(56) References Cited

U.S. PATENT DOCUMENTS

| | | | |
|---|---|---|---|
| 5,489,984 A | 2/1996 | Hariharan et al. | ............ 356/360 |
| 5,808,740 A | 9/1998 | Tanaka et al. | |
| 5,828,456 A | 10/1998 | Aoki et al. | |
| 5,841,535 A | 11/1998 | Aoki et al. | |

FOREIGN PATENT DOCUMENTS

| | | |
|---|---|---|
| DE | 19512445 A1 | 10/1995 |
| JP | 2-22503 | 1/1990 |
| JP | 2517929 | 9/1996 |
| JP | 9-68411 | 3/1997 |

(Continued)

OTHER PUBLICATIONS

Machine translation of JP 10-103918.*

(Continued)

*Primary Examiner* — Hwa Lee
(74) *Attorney, Agent, or Firm* — Kratz, Quintos & Hanson, LLP

(57) ABSTRACT

A laser interferometer (10) comprises: a first beam splitter (22) which splits a laser beam emitted from a light source (3) into a first beam (L2) and a second beam; a second beam splitter (24) which splits the second beam into a third beam (L1) and a fourth beam (L3), and which causes reflected beams, produced by reflection of the split beams (L1, L3) and incident from reverse directions to the directions of the split beams, to exit in a reverse direction to the direction of the second beam; and a beam selecting unit (50, 51, 60, 66, 68) which, from among the reflected beams produced by reflection of the third and fourth beams (L1, L3) and caused to exit the second beam splitter (24) in the reverse direction to the direction of the second beam, selects a beam to be combined in the first beam splitter (22) with a reflected beam produced by reflection of the first beam (L2) and incident on the first beam splitter from a reverse direction to the direction of the first beam (L2).

17 Claims, 13 Drawing Sheets

(56) References Cited

FOREIGN PATENT DOCUMENTS

| | | |
|---|---|---|
| JP | 9-178414 | 7/1997 |
| JP | 9-183042 | 7/1997 |
| JP | 9-196623 | 7/1997 |
| JP | 9-243322 | 9/1997 |
| JP | 9-244718 | 9/1997 |
| JP | 10-103918 | 4/1998 |

OTHER PUBLICATIONS

Office Action dated Apr. 27, 2009 corresponding to German patent application No. 11 2006 002 170.2-52 with English translation.

* cited by examiner

LASER DISTANCE MEASURING APPARATUS WITH BEAM SWITCH

TECHNICAL FIELD

The present invention relates to a laser distance measuring apparatus which splits a laser beam into two parts, one directed to a reflective mirror (corner cube) mounted on an object to be measured and the other to a fixed reference corner cube, causing the two parts reflected back from the respective corner cubes to interfere with each other, and then measures the distance of movement relative to the object by counting the number of resulting interference fringes which change as the amount of the relative movement changes. More specifically, the invention relates to a laser distance measuring apparatus that measures errors in the amount of movement in each moving axis direction of a numerically controlled (NC) machine tool, as defined in ISO 230-2, JIS-B-6201-1990, etc.

BACKGROUND ART

Test items and test methods for evaluating the accuracy of NC machine tools are defined in ISO 230-2, JIS-B-6201-1990, and other standards. The test items defined in such standards include errors in the amount of movement in each moving axis as well as backlash, yawing, etc. As a test method for determining errors in the amount of movement in each moving axis, for example, a method is defined that performs operations of moving incrementally by a prescribed amount along each moving axis direction, and then moving back incrementally by the same amount in the opposite direction, and then calculates the maximum value or the root-mean-square value of the errors at the respective moving points.

For the measurements of the test items such as described above, conventional contact-type gauges or magnetic scales may be used, however, laser distance measuring apparatus are more commonly used. FIG. 1 is a diagram showing an example of a prior art arrangement for measuring the accuracy of an NC machine tool (machining center) by using a laser distance measuring apparatus. As shown in FIG. 1, machine tool 91 comprises a machining tool section 92 for holding and driving a machining tool, a workpiece table 93 on which a workpiece is placed, and an NC controller 97 for controlling them. Machining tool section 92 is movable up and down (in the Z-axis direction), and workpiece table 93 is movable in two orthogonal directions in a plane perpendicular to the Z-axis direction; their movements are controlled by NC controller 97.

In the measurement of errors in the amount of movement and backlash as defined in ISO 230-2 and JIS-B-6201-1990, the actual movement amount is measured when an instruction is entered from the NC controller 97 to move in each axis direction by a prescribed amount. The illustrated example shows a case in which errors in the amount of movement and backlash in the direction indicated by arrow (X-axis direction) are measured; first, a laser light source 3 is set up so that the optical axis of the laser light emitted from laser light source 3 coincides with the X-axis direction. Next, an interference optical unit 100 constituting a part of the laser gauge interferometer is attached to the tip of machining tool section 92 so that the laser light enters the unit, and a reflective mirror (corner cube) 17 is mounted at an edge of workpiece table 93.

FIG. 2 is a diagram showing the configuration of interference optical unit 13. Laser light source 3 is a laser light source having good coherence (i.e., a long coherence length) such as a He—Ne laser, and the laser light emitted from it is split by a polarization beam splitter 131 into two laser beams. Here, polarization beam splitter 131 is set up with its optical axis oriented at 45 degrees relative to the plane of polarization of the incident laser light. In this case, the laser light transmitted through polarization beam splitter 131 is called P polarization, while the laser light reflected by polarization beam splitter 131 is called S polarization, the planes of the P and S polarizations being oriented at right angels to each other.

One laser beam (P polarization) is directed to corner cube 17 mounted on an edge of workpiece table 93, where the laser beam is reflected back in the reverse direction toward polarization beam splitter 131. The other laser beam (S polarization) is directed to a reference corner cube 132 provided in interference optical unit 100, where the laser beam is reflected back in the reverse direction toward polarization beam splitter 131. The laser beam reflected by corner cube 17 and entering polarization beam splitter 131 and the laser beam reflected by reference corner cube 132 and entering polarization beam splitter 131 overlap each other at polarization beam splitter 131, and the emergent light passes through a polarizer 138 and enters a light detector 133.

The two beams interfere with each other, forming an interference fringe whose intensity is greatest when the path-length difference between the two beams is an integral multiple of the laser beam wavelength and the smallest when the path-length difference is an integral multiple plus one-half of the wavelength. As a result, as workpiece table 93, and hence corner cube 17 mounted on an edge thereof, moves in a relative fashion, the output intensity of light detector 133 changes cyclically. More specifically, when corner cube 17 moves in a relative fashion by an amount equivalent to one-half of the wavelength, a path-length difference equal to one wavelength occurs in a round trip, the moving distance of corner cube 17, i.e., workpiece table 93, is given by one-half of the wavelength multiplied by the number of cycles in which the output intensity of light detector 133 changes.

The output signal of light detector 133 is amplified by an amplifier 134, and the amplified signal is compared in a comparator 135 with an intermediate level of the output signal and converted into a binary signal which is counted by a counter 136. A measurement value calculating unit 137 calculates the distance of movement from the value of counter 136.

Test items and test methods for evaluating the accuracy of NC machine tools are defined in ISO 230-2, JIS-B-6201-1990, and other standards, and errors in the amount of movement in each moving axis direction defined in such standards are usually measured using a laser distance measuring apparatus. In the prior art, after attaching the interference unit shown in FIG. 2 to the machine tool, the external laser light source is set up so that the laser light enters the interference unit; then, the reflective mirror (corner cube) is mounted on the workpiece table of the machine tool, and the moving distance of the table is measured. However, not only does it involve laborious procedures to set up the laser light source so that the laser light enters the interference unit in parallel to each moving axis, but there are also cases where such a setting is not possible. Japanese Utility Model Registration No. 2517929 proposes a separate-type laser interferometer that greatly enhances the freedom of setting by using an optical fiber to transmit the laser beam from the laser light source to the interference optical unit, and the above problem can be solved by using such a separate-type laser interferometer.

However, machine tools usually have three moving axes, and errors in the amount of movement must be measured for all the moving axes. As a result, when measurements along one moving axis are completed, the orientation of the interference unit and the position of the corner cube must be changed so as to make measurements along another moving axis, resulting in a problem that adjustment work is laborious and time consuming. To solve this problem, the Applicant discloses in Japanese Unexamined Patent Publication No. H09-243322 a laser interferometer that can be switched to emit a measuring laser beam in a selected one of three directions oriented orthogonal to each other.

DISCLOSURE OF THE INVENTION

In this way, when measuring the moving distances in the three orthogonal axis directions by using a laser interferometer, it has been practiced in the prior art to measure the positioning of each axis of the machine tool, etc., by using a measuring head that can switch the emitting direction of the measuring beam between the three orthogonal axis directions. In this case, the beam emitting direction must be adjusted so that the beam to be emitted from the measuring head in any one of the three orthogonal axis directions is orthogonal to the other two axis directions.

To accomplish the adjustment, a wedge prism provided for each emitting beam has been adjusted, for example, by selecting three combinations of two of the three orthogonal axis beams and by bending the optical axis of one of the two beams through 90 degrees by means of a penta prism so that the optical axis becomes parallel to the optical axis of the other beam.

However, the laser interferometer shown in Japanese Utility Model Registration No. 2517929 is constructed so that, of the beams to be emitted in the three orthogonal axis directions, only the beam to be emitted in the measuring direction is emitted from the interference optical unit, and the beams to be emitted in any two axis directions cannot exit simultaneously, which makes the above adjustment difficult to accomplish. As a result, there has been the possibility that the adjustment of the orthogonality may not be accomplished properly.

In view of the above problem associated with a laser interferometer that emits the measuring laser beam in three orthogonal axis directions and measures the amounts of relative movements in the three axis directions, it is an object of the present invention to provide a laser interferometer that can easily adjust the orthogonality between the three orthogonal axis directions.

To achieve the above object, a laser distance measuring apparatus as a laser interferometer according to the present invention splits a laser beam into a measuring beam directed to a measuring reflective unit and a reference beam, generates interference light through interference between the measuring beam returned by reflection and the reference beam, and measures the distance of movement relative to the measuring reflective unit by counting changes in interference fringes formed by the interference light, wherein among three orthogonal directions in which the measuring beam is emitted, the measuring beam is constantly emitted at least in one axis direction.

As described above, the orthogonality between the three axis measuring beams is adjusted by combining two axis measuring beams and in this case, since the measuring beam is constantly emitted in one axis direction, the orthogonality can be adjusted easily and accurately.

For example, when one of the three axis measuring beams is constantly emitted, since two axis beams are always present in two of the three combinations of the two axis measuring beams, the adjustment can be accomplished easily and accurately. When two of the three axis measuring beams are constantly emitted, since two axis beams are always present, the adjustment can be accomplished easily and accurately.

To achieve this, the laser distance measuring apparatus according to the present invention comprises: a first beam splitter which splits the laser beam into a first beam and a second beam; a second beam splitter which splits the second beam into a third beam and a fourth beam, and which causes reflected beams, produced by reflection of the third and fourth beams and incident from reverse directions to the directions of the third and fourth beams, to exit in a reverse direction to the direction of the second beam; a first reference reflective unit which, when either one of the third and fourth beams is emitted as the measuring beam, moves into a light path of the first beam and reflects the first beam incident thereon into the direction of incidence, thereby producing the reference beam; a second reference reflective unit which, when the first beam is emitted as the measuring beam, moves into a light path of the third beam and reflects the third beam incident thereon into the direction of incidence, thereby producing the reference beam; a beam selecting unit which, from among the reflected beams produced by reflection of the third and fourth beams and caused to exit the second beam splitter in the reverse direction to the direction of the second beam, selects a beam to be combined in the first beam splitter with a reflected beam produced by reflection of the first beam and incident on the first beam splitter from a reverse direction to the direction of the first beam; and a light detecting unit which generates an electrical signal that matches the interference fringes formed by the interference light that is generated through interference between the beam selected by the beam selecting unit and the reflected beam produced by reflection of the first beam, wherein the first, third, and fourth beams are each emitted as the measuring beam in a corresponding one of the three axis directions, and of these beams, the fourth beam is constantly emitted.

The beam selecting unit may be implemented as a second polarization adjusting unit that can be switched so that the direction of polarization of each of the reflected beams caused to exit the second beam splitter in the reverse direction to the direction of the second beam is rotated or not rotated through 90 degrees. In this case, polarization beam splitters are provided as the first and second beam splitters, and a first polarization adjusting unit for rotating the direction of polarization of the second beam through 45 degrees is provided between these beam splitters.

The second polarization adjusting unit may be constructed as a half-wave plate movable between a position located in a light path and a position that does not block the light path, or as an electro-optical device, such as a liquid crystal optical device, that can be switched so that the laser beam passing therethrough is rotated or not rotated through 90 degrees, depending on an applied voltage.

Alternatively, the beam selecting unit may be implemented as a polarizing unit which is provided in the light path of the reflected beams produced by reflection of the third and fourth beams and caused to caused to exit the second beam splitter in the reverse direction to the direction of the second beam, and whose direction of polarization is changed so as to allow only a selected one of the reflected beams to pass therethrough. In this case, the second beam splitter is constructed as a polarization beam splitter.

The polarizing unit may be constructed as a plurality of polarizers having different directions of polarization and movable, one at a time, into the light path, or as a polarizer whose direction of polarization can be changed by rotating about the light path as a rotation axis; alternatively, the polarizing unit may be constructed as an electro-optical device, such as a liquid crystal optical device, whose direction of polarization can be changed according to an applied voltage.

The above and other objects and features of the present invention will become clearer from the following description of the preferred embodiments given with reference to the accompanying drawings.

BEST MODE FOR CARRYING OUT THE INVENTION

Figure 3:
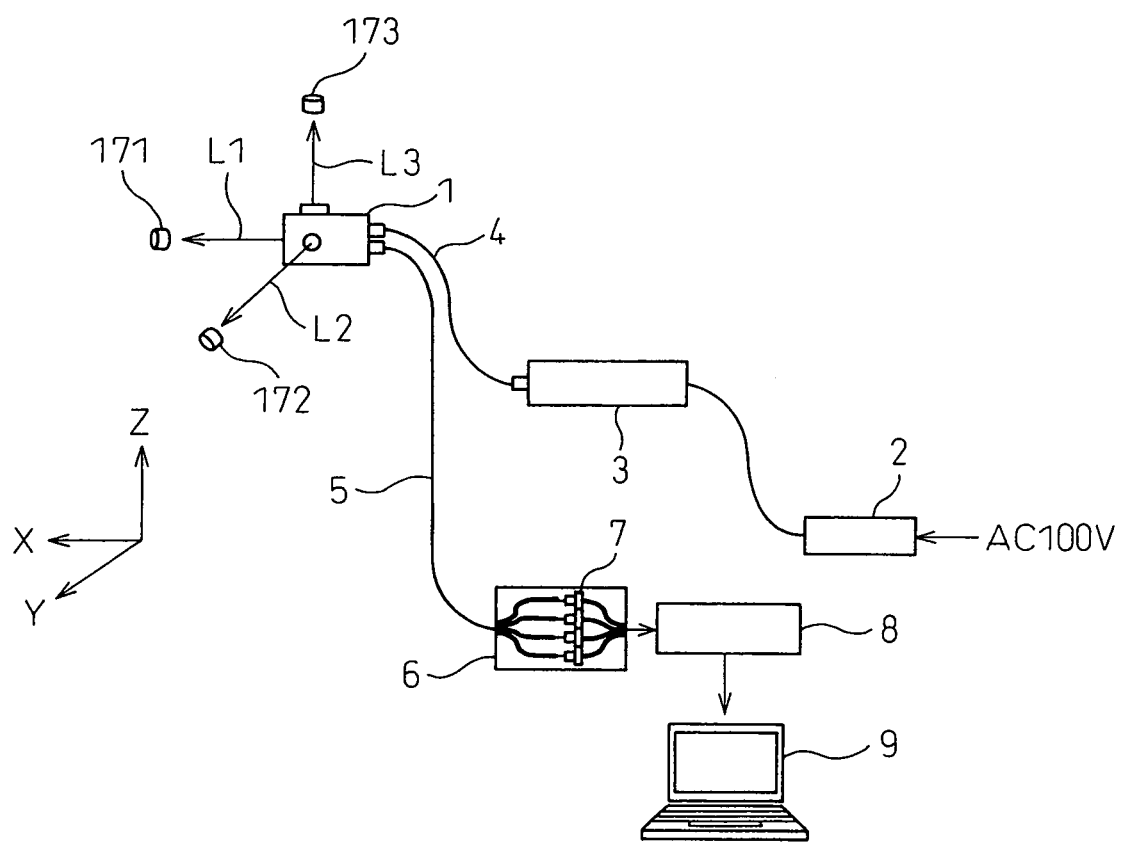
FIG. 3 is a block diagram showing a laser interferometer according to an embodiment of the present invention.

The embodiments of the present invention will be described below with reference to the accompanying drawings. FIG. 3 is a block diagram showing a laser interferometer according to an embodiment of the present invention. As shown, the laser interferometer comprises a power supply 2, a wavelength-stabilized HeNe laser light source 3, connected to power supply 2, for emitting a laser beam whose wavelength is stabilized by wavelength stabilization control, and a polarization maintaining fiber 4 for transmitting the laser beam to an interference optical unit 1 to be described hereinafter.

Figure 1:
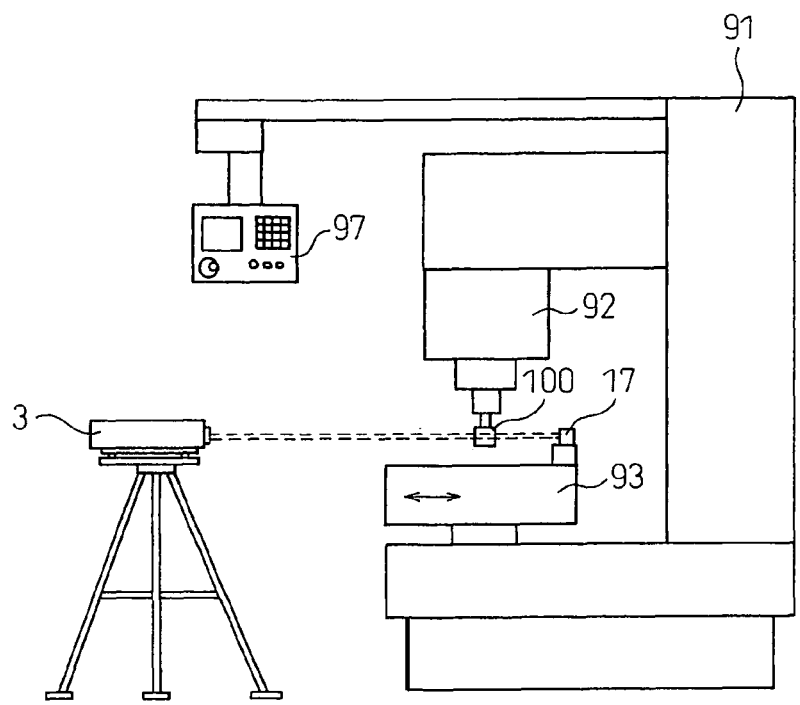
FIG. 1 is a diagram showing an example of a prior art setup for measuring errors in movement in the moving direction of an NC machine tool.
Figure 2:
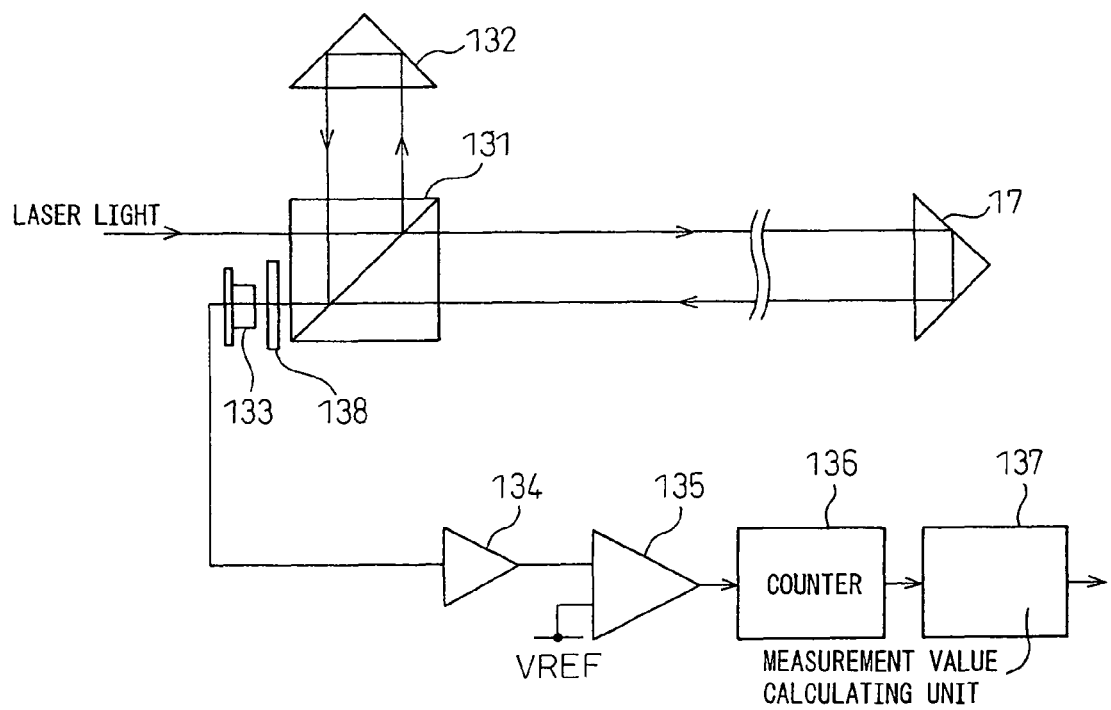
FIG. 2 is a diagram showing the configuration of a prior art interference optical unit.

When using this laser interferometer to measure the accuracy of the NC machine tool previously described with reference to FIGS. 1 and 2, interference optical unit 1 is attached to the tip of machining tool section 92 which holds and drives the machining tool in machine tool 91. Then, a measuring reflective unit 171, by which a measuring beam L1 emitted in a first axis direction from interference optical unit 1 is reflected back to interference optical unit 1, a measuring reflective unit 172, by which a measuring beam L2 emitted in a second axis direction is reflected back to interference optical unit 1, and a measuring reflective unit 173, by which a measuring beam L3 emitted in a third axis direction is reflected back to interference optical unit 1, are mounted on workpiece table 93. Corner cubes are used advantageously as the measuring reflective units 171 to 173.

The laser interferometer further comprises an optical-to-electrical converting unit 6 which converts four phase interference signals shifted in phase by 90 degrees relative to each other into four phase electrical signals by means of photodetectors 7, the four phase interference signals being produced by causing the measuring beams reflected by the measuring reflective units 171 to 173 back to interference optical unit 1 to interfere in interference optical unit 1 with a reference beam to be described later.

The laser interferometer further includes a light guide 5 which transmits the four phase interference signals from interference optical unit 1 to optical-to-electrical converting unit 6, a counter unit 8 which counts the changes in the intensities of the four phase electrical signals output from optical-to-electrical converting unit 6, and a computing unit 9, such as a personal computer, which computes length by multiplying the count value by the wavelength.

Figure 4:
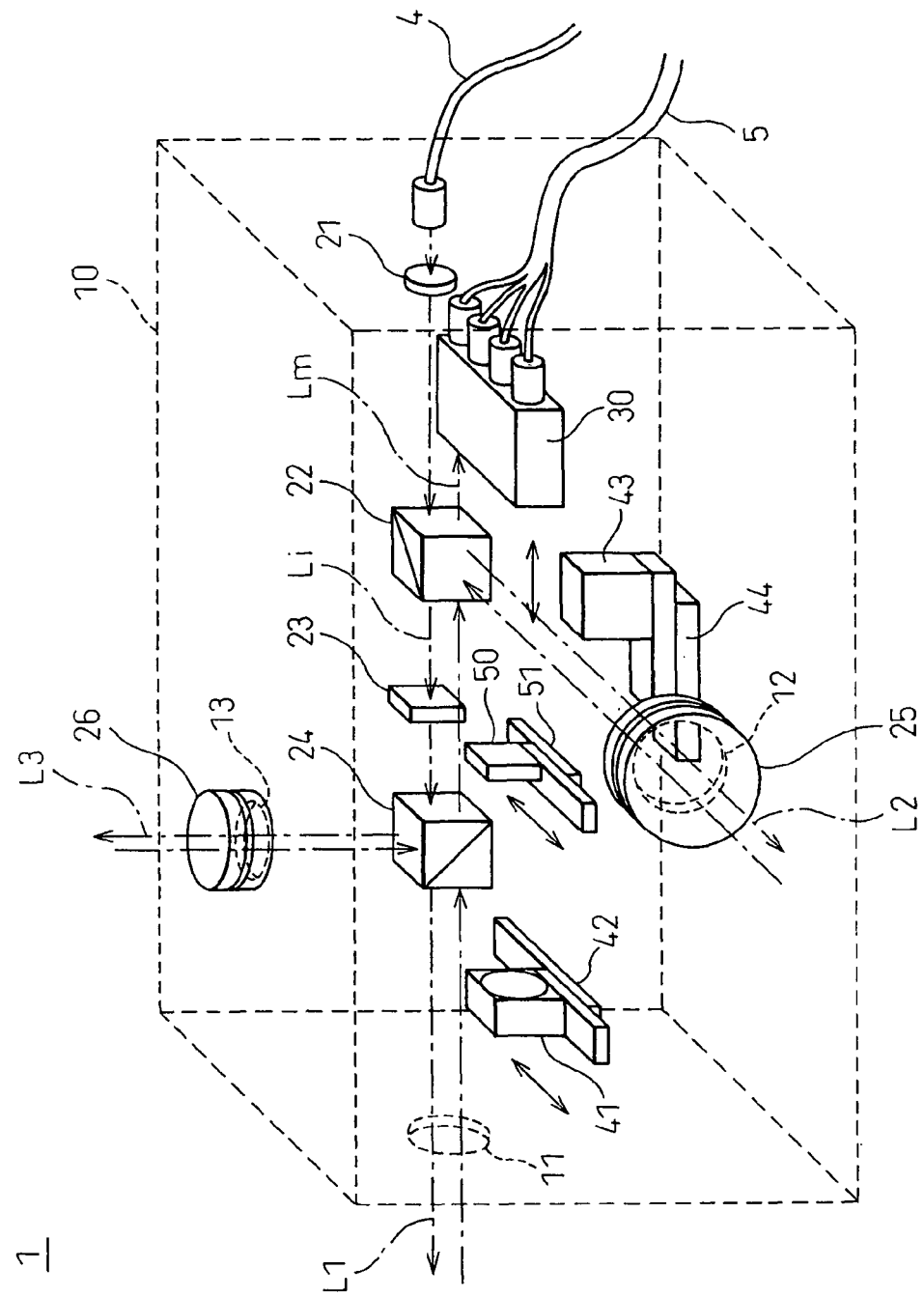
FIG. 4 is a diagram showing the configuration of an optical interference unit shown in FIG. 3.

FIG. 4 is a diagram showing the configuration of optical interference unit 1 shown in FIG. 3. Optical interference unit 1 comprises a collimator lens 21 which converts the laser light emerging from polarization maintaining fiber 4 into a parallel beam of light, a first polarization beam splitter 22 which splits the parallel beam of light into second axis beam L2 that propagates in the second axis direction and a beam Li that propagates in the first axis direction, a half-wave plate 23 which rotates the polarization direction of beam Li through 45 degrees, and a second polarization beam splitter 24 which splits beam Li passed through half-wave plate 23 into first axis beam L1 that propagates in the first axis direction and beam L3 that propagates in the third axis direction.

Optical interference unit 1 further comprises: a first reference reflective unit 43 which moves into the light path of second axis beam L2 and reflects the second axis beam incident thereon back into the direction of incidence to produce a reference beam when either first axis beam L1 or third axis beam L3 is emitted as a measuring beam through a light exit hole 11 or 13 formed in the housing 10 of optical interference unit 1; a moving mechanism 44 for moving first reference reflective unit 43; a second reference reflective unit 41 which moves into the light path of first axis beam L1 and reflects the first axis beam incident thereon back into the direction of incidence to produce a reference beam when second axis beam L2 is emitted as a measuring beam through a light exit hole 12; and a moving mechanism 42 for moving second reference reflective unit 41. The reference reflective units 41 and 43 may each be constructed from a corner cube.

Here, when first axis beam L1 is reflected in the reverse direction by measuring reflective unit 171 or second reference reflective unit 41, the reflected beam again enters second polarization beam splitter 24 and exits in the reverse direction to the direction of beam Li, and likewise, when third axis beam L3 is reflected in the reverse direction by the measuring reflective unit 173 or the like, the reflected beam also enters second polarization beam splitter 24 and exits in the reverse direction to the direction of beam Li. Then, the reflected beams produced by reflection of first axis beam L1 and third axis beam L3 again enter first polarization beam splitter 22.

On the other hand, when second axis beam L2 is reflected in the reverse direction by measuring reflective unit 172 or first reference reflective unit 43, the reflected beam again enters first polarization beam splitter 22.

Optical interference unit 1 further includes a beam selecting unit 50, 51 which selects one of the reflected beams, produced by reflection of first axis beam L1 and third axis beam L3 and caused to exit second polarization beam splitter 24 in the reverse direction to the direction of beam Li, as a beam to be combined with the reflected beam of second axis beam L2 in first polarization beam splitter 22. In the embodiment shown in FIG. 4, the beam selecting unit comprises a half-wave plate 50 which rotates the polarization direction (polarization plane) of the reflected beam through 90 degrees, and a moving mechanism 51 capable of moving half-wave plate 50 between a position located in the light path of the reflected beam and a position that does not block the light path.

Optical interference unit 1 further includes a receiver unit 30 which receives a combined beam Lm produced by combining either the reflected beam of first axis beam L1 or the reflected beam of third axis beam L3 with the reflected beam of second axis beam L2, and produces the four phase interference signals shifted in phase by 90 degrees relative to each other by causing the reflected beams to interfere with each other.

Optical interference unit 1 further includes wedge prisms 25 and 26 for adjusting the directions of second axis beam L2 and third axis beam L3 exiting through light exiting holes 12 and 13 formed in housing 10.

Figure 5:
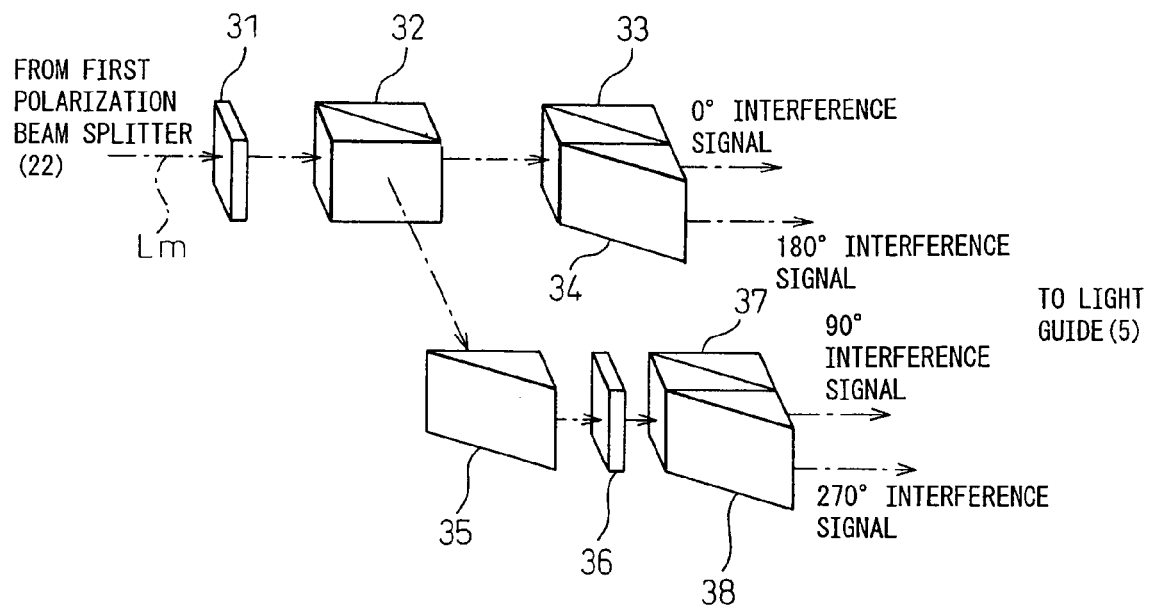
FIG. 5 is a diagram showing the configuration of a receiver unit shown in FIG. 3.

FIG. 5 is a diagram showing the configuration of receiver unit 30 shown in FIG. 4. In the figure, reference numeral 31 is a half-wave plate which rotates the polarization direction (polarization plane) of the combined beam Lm produced at first polarization beam splitter 22 through 45 degrees, 32 is a non-polarization beam splitter, 33 is a polarization beam splitter, and 34 is a 45-degree right-angle prism. Further, reference numeral 35 is a 45-degree right-angle prism, 36 is a quarter-wave plate for introducing a 90-degree phase shift into either the component relating to the reflected beam of second axis beam L2 contained in beam Lm or the component relating to the reflected beam of first axis beam L1 or third axis beam L3 contained in beam Lm, 37 is a polarization beam splitter, and 38 is a 45-degree right-angle prism.

The functions of these elements will be described below with reference to FIG. 6 in conjunction with the operation of optical interference unit 1 when measuring the distance in the first axis direction.

Figure 6:
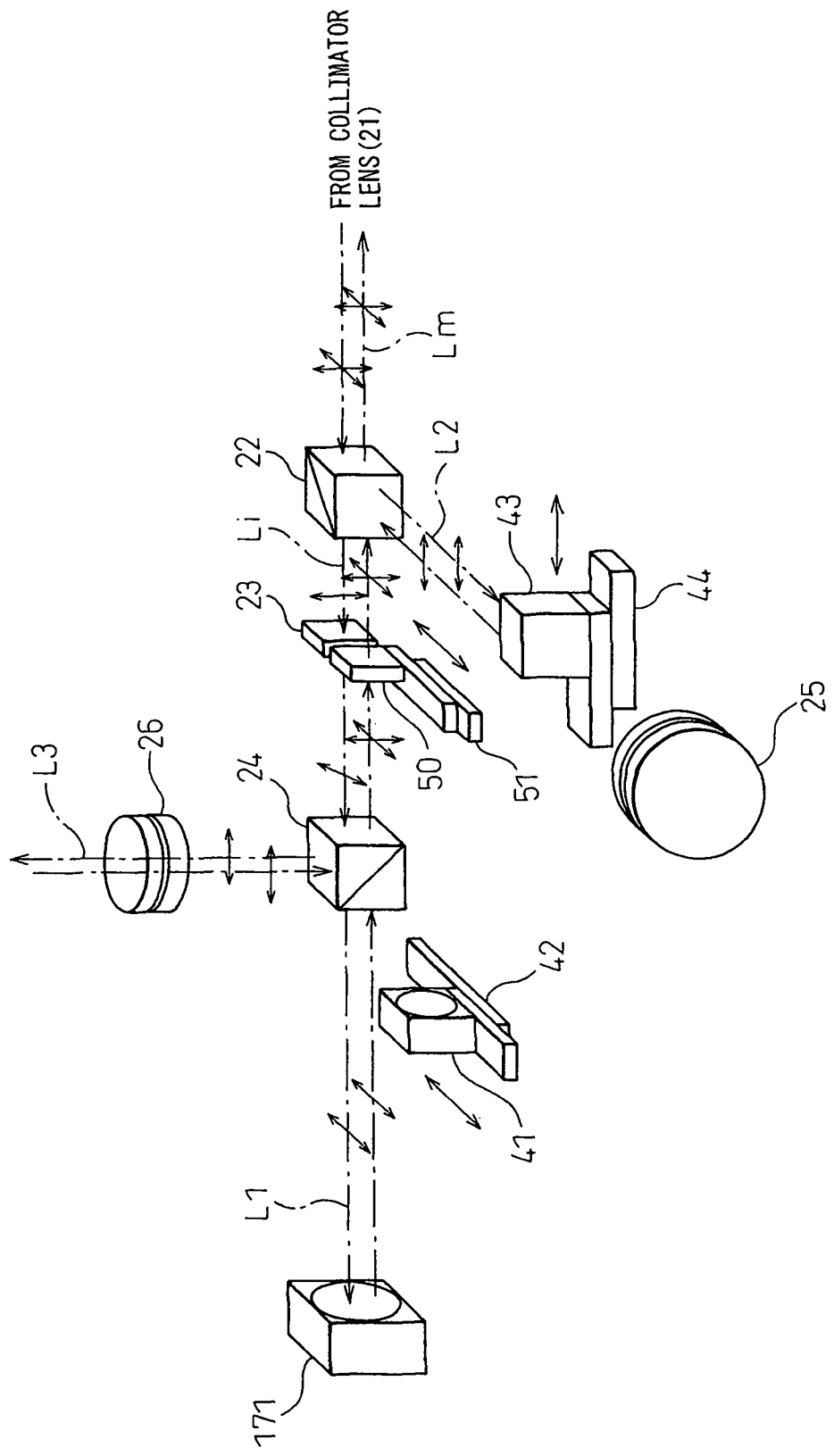
FIG. 6 is a diagram for explaining the operation of the optical interference unit when measuring the distance in a first axis direction.

FIG. 6 is a diagram for explaining the operation of interference optical unit 1 when measuring the distance in the first axis direction. The laser light emerging from polarization maintaining fiber 5 is converted by collimator lens 21 into a parallel beam of light propagating in the first axis direction.

Then, this laser beam is split by first polarization beam splitter 22 into two parts, one of which is reflected in the second axis direction at right angles to the direction of incidence and emerges as second axis beam L2 composed of S polarization component, while the other part emerges as beam Li composed of P polarization component propagating in the same direction as the propagation direction of the incident light. In the figure, double-headed arrows attached to the optical axes of the beams designated by dashed lines indicate the polarization directions of the respective beams.

After that, the polarization axis of the split beam Li is rotated through 45 degrees as it passes through half-wave plate 23. Beam Li is further split by second polarization beam splitter 24 into two parts, one of which is transmitted through second polarization beam splitter 24 and emerges as first axis beam L1 composed of S polarization component propagating in the first axis direction, while the other part is reflected by second polarization beam splitter 24 and emerges as third axis beam L3 composed of P polarization component propagating in the third axis direction.

First axis beam L1 exits optical interference unit 1, is reflected by measuring reflective unit 171 mounted on the object to be measured, and returns to optical interference unit 1.

On the other hand, third axis beam L3 reflected by second polarization beam splitter 24 is passed through wedge prism 26 and output as constantly emitted light. This wedge prism 26 is provided to adjust the direction of third axis beam L3 in order to ensure mutual orthogonality between the three axes. It is desirable that the third axis direction in which the laser light is constantly emitted be set so as to point to the plumbline direction of the machine tool for safety reasons.

The reflected beam of first axis beam L1 reflected by the measuring reflective unit 171 and returned with its position displaced by a certain amount (for example, 10 mm) is again passed through second polarization beam splitter 24. Then, its polarization axis (polarization direction) is rotated through 90 degrees as it passes through half-wave plate 50 positioned in its light path by the moving mechanism 51, and the beam thus emerges as a P-polarized beam. As a result, the beam passes through first polarization beam splitter 22, and enters receiver unit 30 as a measuring beam.

On the other hand, second axis beam L2 reflected by first polarization beam splitter 22 is reflected by first reference reflective unit 43 positioned in its light path and returns with its position displaced by a certain amount (for example, 10 mm); the returned beam is then reflected by first polarization beam splitter 22, and enters receiver unit 30 as a reference beam.

Turning back to FIG. 5, combined beam Lm produced by combining the reflected beam (measuring beam) of first axis beam L1 and the reflected beam (reference beam) of second axis beam L2 at first polarization beam splitter 22 enters receiver unit 30. In this case, the measuring beam is composed of P polarization component, and the reference beam is composed of S polarization component.

As combined beam Lm passes through half-wave plate 31, the polarization directions (polarization planes) of both of the P and S polarization components are rotated through 45 degrees, and the beam thus rotated enters non-polarization beam splitter 32. The beam entering non-polarization beam splitter 32 is split into two parts, one transmitted therethrough and the other reflected, and the transmitted beam enters polarization beam splitter 33 where it is further split. The laser light split by polarization beam splitter 33 produces interference signals through interference between the measuring beam and the reference beam. Here, the interference signal generated by reflection is generated as a signal whose light/dark phase is shifted by 180 degrees with respect to the interference signal generated by transmitting through polarization beam splitter 33. The interference signal reflected by polarization beam splitter 33 is further reflected by 45-degree right-angle prism 34 and emerges in parallel to the 0-degree interference signal.

On the other hand, combined beam Lm reflected by non-polarization beam splitter 32 is reflected by 45-degree right-angle prism 35, after which either the measuring beam or the reference beam is shifted in phase by 90 degrees by the action of quarter-wave plate 36. The resulting light then enters polarization beam splitter 37 where interference signals are generated through interference between the measuring beam and the reference beam.

The interference signal generated by reflection is then generated as a signal whose light/dark phase is shifted by 180 degrees with respect to the interference signal generated by transmitting through polarization beam splitter 37. However, since the phase is shifted by 90 degrees by quarter-wave plate 36, the interference signal generated by transmitting through polarization beam splitter 37 has a 90-degree phase shift with respect to the 0-degree interference signal, and likewise, the interference signal generated by reflection has a 270-degree phase shift.

The thus generated four phase interference signals shifted in phase by 0 degree, 90 degrees, 180 degrees, and 270 degrees enter the light guide 5 shown in FIG. 4, and are transmitted to optical-to-electrical converting unit 6. After that, the four phase interference signals are converted by optical-to-electrical converting unit 6 into four phase electrical signals which are input to counter unit 8.

Counter unit 8 generates from the four phase signals a difference signal between the 0-degree interference signal and the 180-degree interference signal (0-degree interference signal-180-degree interference signal) and a difference signal between the 90-degree interference signal and the 270-degree interference signal (90-degree interference signal-270-degree interference signal). By so doing, the DC component contained in each interference signal is eliminated while doubling the signal amplitude, thereby eliminating errors, etc. arising from variations in the amount of light. Furthermore, by using the phase signals (0-degree interference signal-180-degree interference signal) and (90-degree interference signal-270-degree interference signal) shifted in phase by 90 degrees relative to each other, frequency dividing counting as well as the discrimination of direction becomes possible.

Based on these phase signals (0-degree interference signal-180-degree interference signal) and (90-degree interference signal-270-degree interference signal), the counter unit 8 produces a count number which is converted by computing unit 9 into a measured value.

Figure 7:
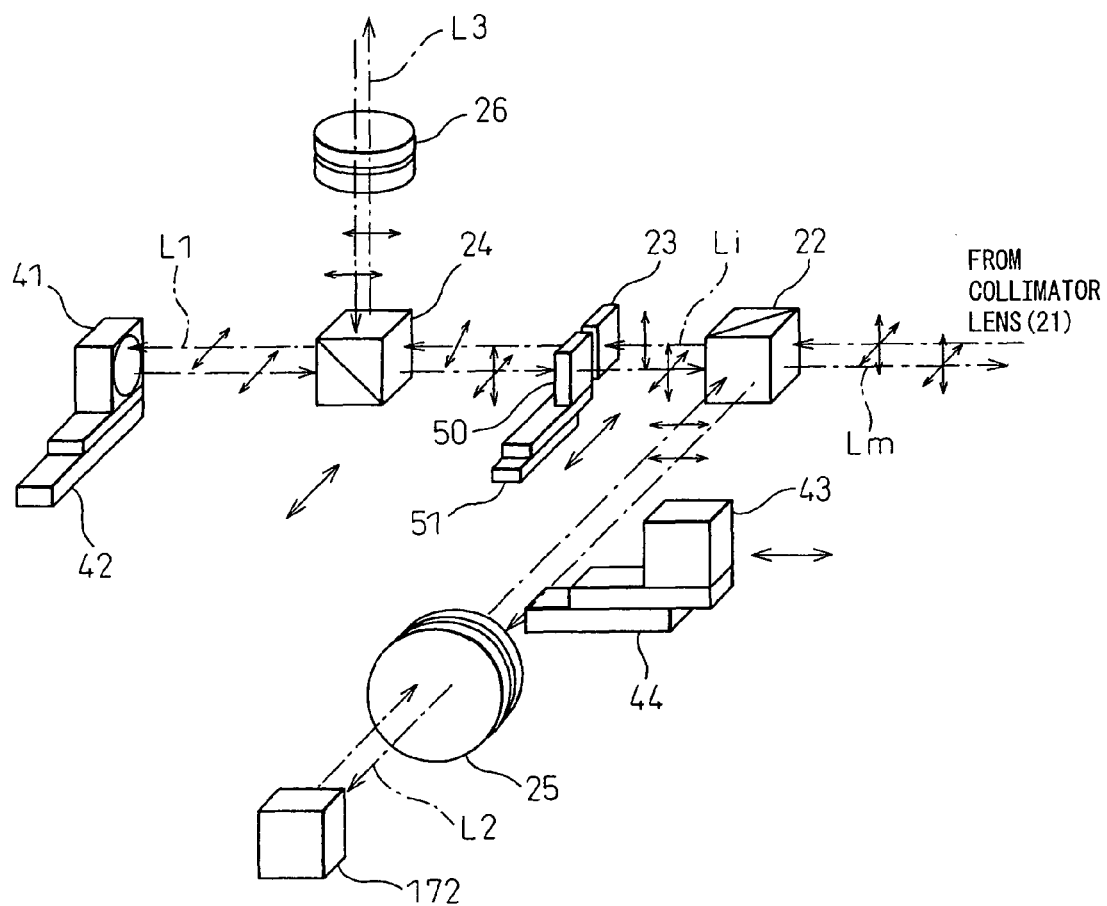
FIG. 7 is a diagram for explaining the operation of the optical interference unit when measuring the distance in a second axis direction.

FIG. 7 is a diagram explaining the operation of optical interference unit 1 when measuring the distance in the second axis direction. Compared with the arrangement of FIG. 6 which concerns the case for making the measurement in the first axis direction, reference reflective units 41 and 43 are moved by means of moving mechanisms 42 and 44, respectively, in such a manner that first reference reflective unit 43 is moved outside the light path of second axis beam L2, while on the other hand, second reference reflective unit 41 is positioned in the light path of first axis beam L1.

The laser light emerging from polarization maintaining fiber 5 is converted by collimator lens 21 into a parallel beam of light propagating in the first axis direction.

Then, this laser beam is split by first polarization beam splitter 22 into two parts, one of which is reflected in the second axis direction at right angles to the direction of incidence and emerges as second axis beam L2 composed of S polarization component, while the other part emerges as beam Li composed of P polarization component propagating in the same direction as the propagation direction of the incident light.

After that, the polarization axis of the split beam Li is rotated through 45 degrees as it passes through half-wave plate 23. Beam Li is further split by second polarization beam splitter 24 into two parts, one of which is transmitted through second polarization beam splitter 24 and emerges as first axis beam L1 composed of S polarization component propagating in the first axis direction, while the other part is reflected by second polarization beam splitter 24 and emerges as third axis beam L3 composed of P polarization component propagating in the third axis direction.

First axis beam L1 is then reflected by second reference reflective unit 41 positioned on its optical axis, and returns with its position displaced by a certain amount (for example, 10 mm).

On the other hand, third axis beam L3 is passed through wedge prism 26 and output as constantly emitted light.

The reflected beam of first axis beam L1 reflected and returned from second reference reflective unit 41 is again passed through second polarization beam splitter 24, and its polarization axis is rotated through 90 degrees as it passes through half-wave plate 50. As a result, the beam passes through first polarization beam splitter 22, and enters receiver unit 30 this time as a reference beam.

On the other hand, second axis beam L2 separated by reflection at first polarization beam splitter 22 does not strike first reference reflective unit 43 that has been moved outside the light path of beam L2 by means of moving mechanism 44, and exits optical interference unit 1 by passing through wedge prism 25; the beam is then reflected by the measuring reflective unit 172 mounted on the object to be measured, returns with its position displaced by a certain amount (for example, 10 mm), and is reflected by first polarization beam splitter 22. The reflected beam enters receiver unit 30 as a measuring beam.

Then, in the same manner as when measuring the distance in the first axis direction as described with reference to FIGS. 5 and 6, receiver unit 30 generates four phase signals through interference between the measuring beam and the reference beam, and outputs them to light guide 5.

Figure 8:
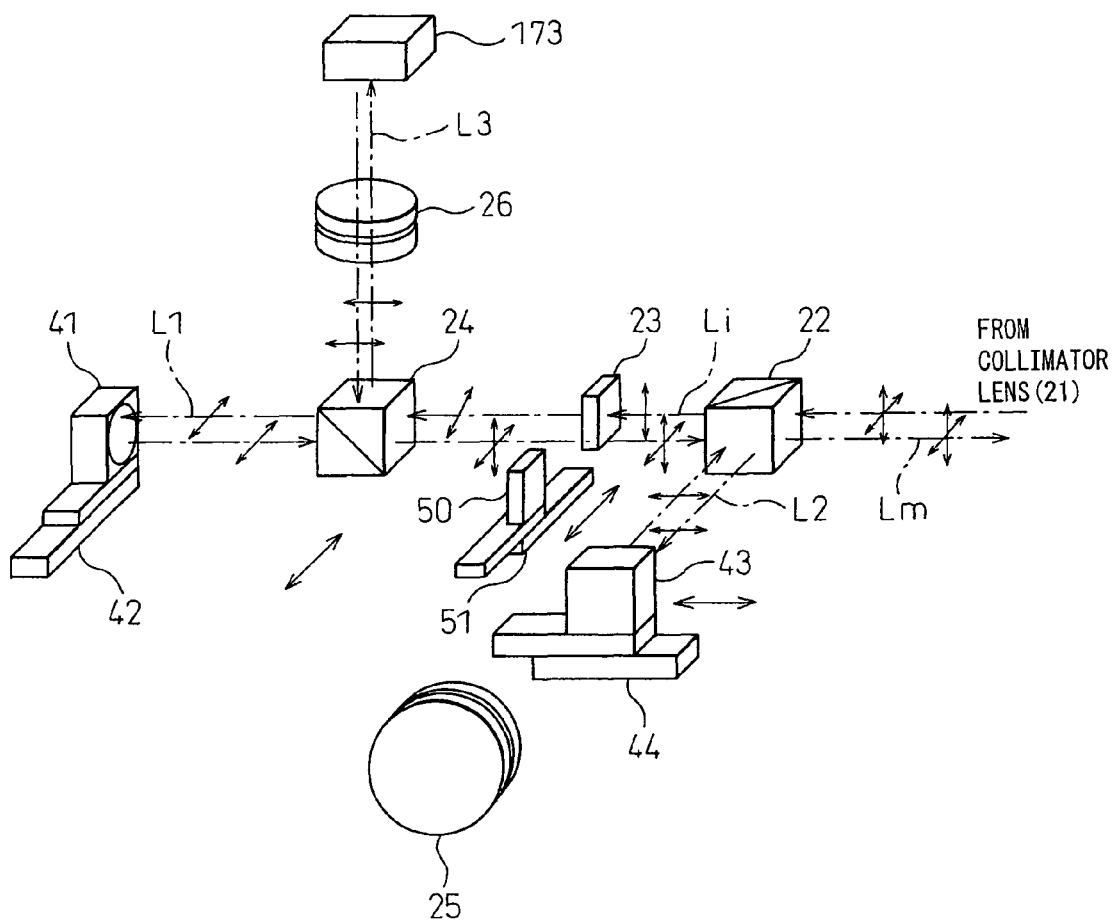
FIG. 8 is a diagram for explaining the operation of the optical interference unit when measuring the distance in a third axis direction.

FIG. 8 is a diagram explaining the operation of optical interference unit 1 when measuring the distance in the third axis direction. Compared with the arrangement of FIG. 6 which concerns the case for making the measurement in the first axis direction, second reference reflective unit 41 is moved by means of moving mechanism 42, and second reference reflective unit 41 and first reference reflective unit 43 are positioned in the light paths of first axis beam L1 and second axis beam L2, respectively.

Further, the position of half-wave plate 50 is moved by means of moving mechanism 51. As a result, half-wave plate 50 is positioned outside the light path of the reflected beam of first axis beam L1 passed through second polarization beam splitter 24 and propagating in the reverse direction to the propagation direction of beam Li and the reflected beam of third axis beam L3 reflected by second polarization beam splitter 24 and propagating in the reverse direction to the propagation direction of beam Li.

The laser light emerging from polarization maintaining fiber 5 is converted by collimator lens 21 into a parallel beam of light propagating in the first axis direction.

Then, this laser beam is split by first polarization beam splitter 22 into two parts, one of which is reflected in the second axis direction at right angles to the direction of incidence and emerges as second axis beam L2 composed of S polarization component, while the other part emerges as beam Li composed of P polarization component propagating in the same direction as the propagation direction of the incident light.

After that, the polarization axis of the split beam Li is rotated through 45 degrees as it passes through half-wave plate 23.

Beam Li is further split by second polarization beam splitter 24 into two parts, one of which is transmitted through second polarization beam splitter 24 and emerges as first axis beam L1 composed of S polarization component propagating in the first axis direction, while the other part is reflected by second polarization beam splitter 24 and emerges as third axis beam L3 composed of P polarization component propagating in the third axis direction. Then, first axis beam L1 is reflected by second reference reflective unit 41 positioned on its optical axis, and returns with its position displaced by a certain amount (for example, 10 mm).

The reflected beam of first axis beam L1 reflected and returned from second reference reflective unit 41 is again passed through second polarization beam splitter 24. After that, the reflected beam of first axis beam L1, which remains as S-polarized light as it is not passed through half-wave plate 50, enters first polarization beam splitter 24 where it is reflected so that it does not enter receiver unit 30.

On the other hand, third axis beam L3 reflected by second polarization beam splitter 24 is passed through wedge prism 26 and emerges as a measuring beam. Then, the beam is reflected back by measuring reflective unit 173 provided for measurement in the third axis, and is again reflected at second polarization beam splitter 24.

Here, third axis beam L3 is not passed through half-wave plate 50, but is introduced directly into first polarization beam splitter 22; since third axis beam L3 is P-polarized light, it passes through first polarization beam splitter 22 and enters receiver unit 30 as a measuring beam.

On the other hand, second axis beam L2 separated by reflection at first polarization beam splitter 22 is reflected by first reference reflective unit 43, and returns with its position displaced by a certain amount (for example, 10 mm); the returned beam is then reflected by first polarization beam splitter 22 and enters receiver unit 30 as a measuring beam.

Then, in the same manner as when measuring the distance in the first axis direction as described with reference to FIGS. 5 and 6, receiver unit 30 generates four phase signals through interference between the measuring beam and the reference beam, and outputs them to light guide 5.

In this way, in optical interference unit 1 according to the embodiment of the present invention, to constantly emit one axis beam (in this case, third axis beam L3), the measuring beam and the reference beam which are caused to interfere with each other are generated from one laser beam by first polarization beam splitter 22, and one beam (beam Li) separated by first polarization beam splitter 22 is further split by second polarization beam splitter 24 into two beams (first axis beam L1 and third axis beam L3) one of which is output as constantly emitted light.

In order to prevent the two beams (first axis beam L1 and third axis beam L3) separated by second polarization beam splitter 24 from interfering with each other, beam selecting unit 50, 51 is provided that selects the reflected beam of only one of these two beams as the beam to be caused to interfere with the reflected beam of the other beam (second axis beam L2) separated by first polarization beam splitter 22.

Figure 9:
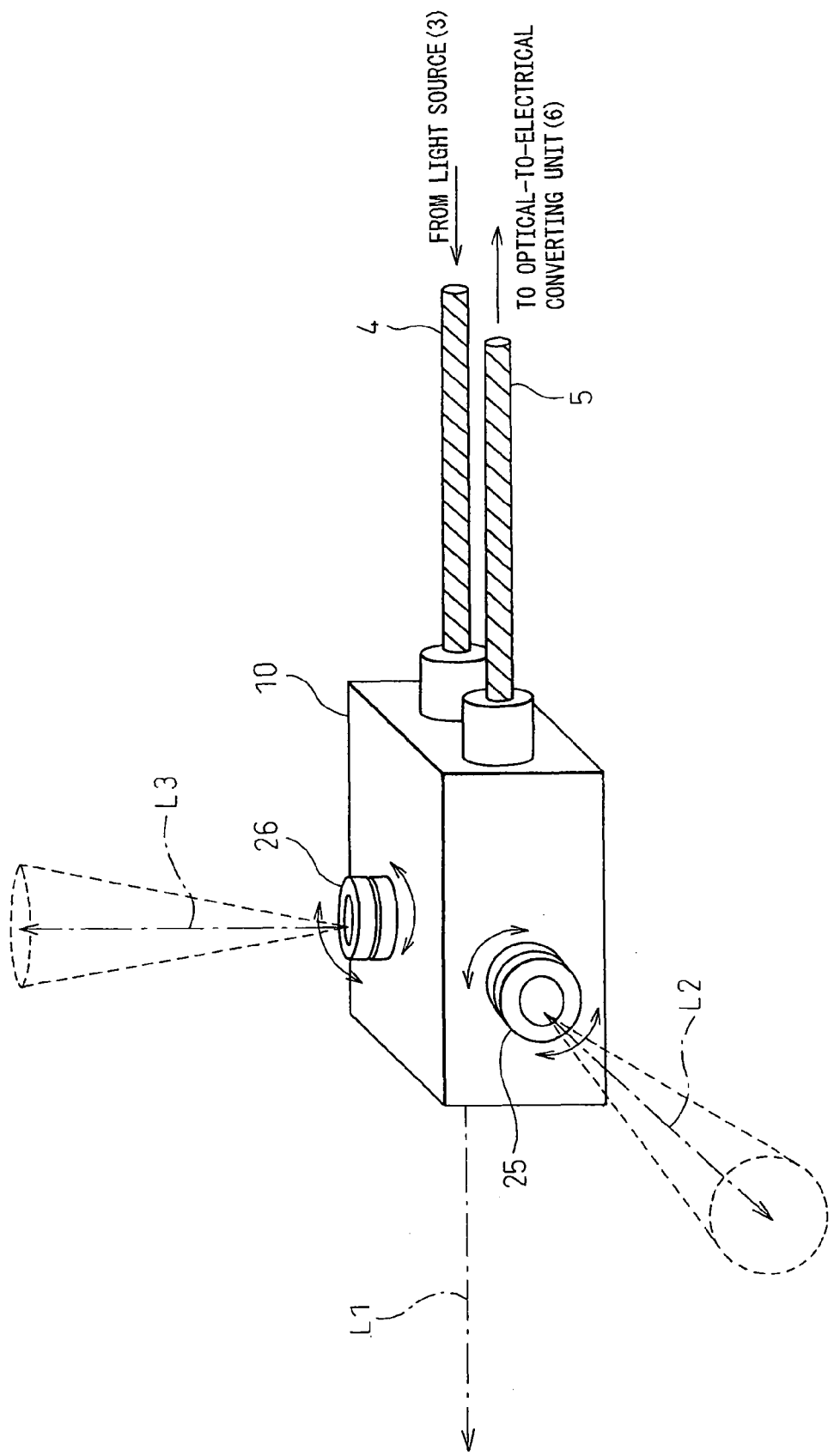
FIG. 9 is a diagram for explaining how the orthogonality between the three axes is adjusted using wedge prisms.

Referring to FIGS. 9 to 13, a description will be given below of how the orthogonality between the three axes is adjusted in optical interference unit 1. FIG. 9 is a diagram for explaining how the orthogonality between the three axes is adjusted using wedge prisms 25 and 26. As shown, second axis beam L2 is adjusted by two-element wedge prism 25, and third axis beam L3 by two-element wedge prism 26. Each of these edge prisms 25 and 26 is constructed to be able to tilt the beam in a desired direction within the cone shown in the diagram by adjusting the two wedge prism elements according to the wedge angle.

Figure 10:
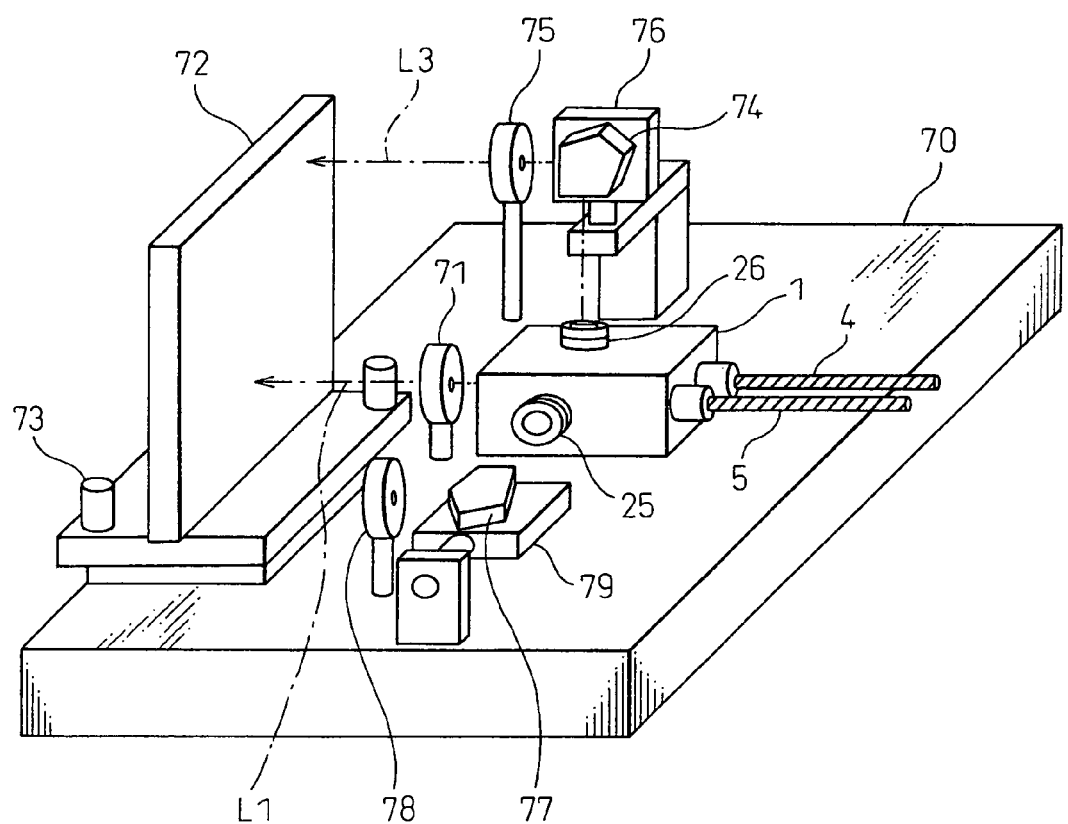
FIG. 10 is a diagram for explaining how the orthogonality between first axis beam L1 and third axis beam L3 is adjusted.

FIG. 10 is a diagram for explaining how the orthogonality between first axis beam L1 and third axis beam L3 is adjusted.

First, on an adjustment table 70 on which a plane mirror 72 is mounted in a vertical position, optical interference unit 1 is placed by orienting its first axis direction toward plane mirror 72. Then, first axis beam L1 is emitted so that it passes through a hole 71 provided between optical interference unit 1 and plane mirror 72, and the beam whose diameter is reduced by passing through hole 71 is reflected by plane mirror 72. The reflected beam returns to hole 71.

Two-way tilt base 73 of plane mirror 72 is then adjusted so that the position of the thus returned beam coincides with the center position of hole 71. The reason that the beam diameter is reduced by passing the beam through hole 71 is that the returning position can be checked with good accuracy.

Next, third axis beam L3 as constantly emitted light is introduced into a penta prism 74 that is supported on a tilt base 76 by adjusting its angle, and the propagation direction of the beam is bent precisely by 90 degrees so that the beam emerges in a direction substantially parallel to the direction of first axis beam L1.

Further, the beam is passed through a hole 75 provided between penta prism 74 and plane mirror 72, and the beam thus reduced in diameter is reflected by plane mirror 72 back to hole 75. Then, two-element wedge prism 26 is adjusted so that the position of the returned beam coincides with the center position of hole 75.

The orthogonality between first axis beam L1 and third axis beam L3 is adjusted as described above; here, when first axis beam is emitted, since third axis beam is emitted at the same time, the position adjustment of first axis beam L1 returned to hole 71 and the position adjustment of third axis beam L3 returned to hole 75 can be accomplished at the same time; in this way, the orthogonality between the two axes can be adjusted easily, compared with the case where the position adjustment is made for one axis at a time.

Figure 11:
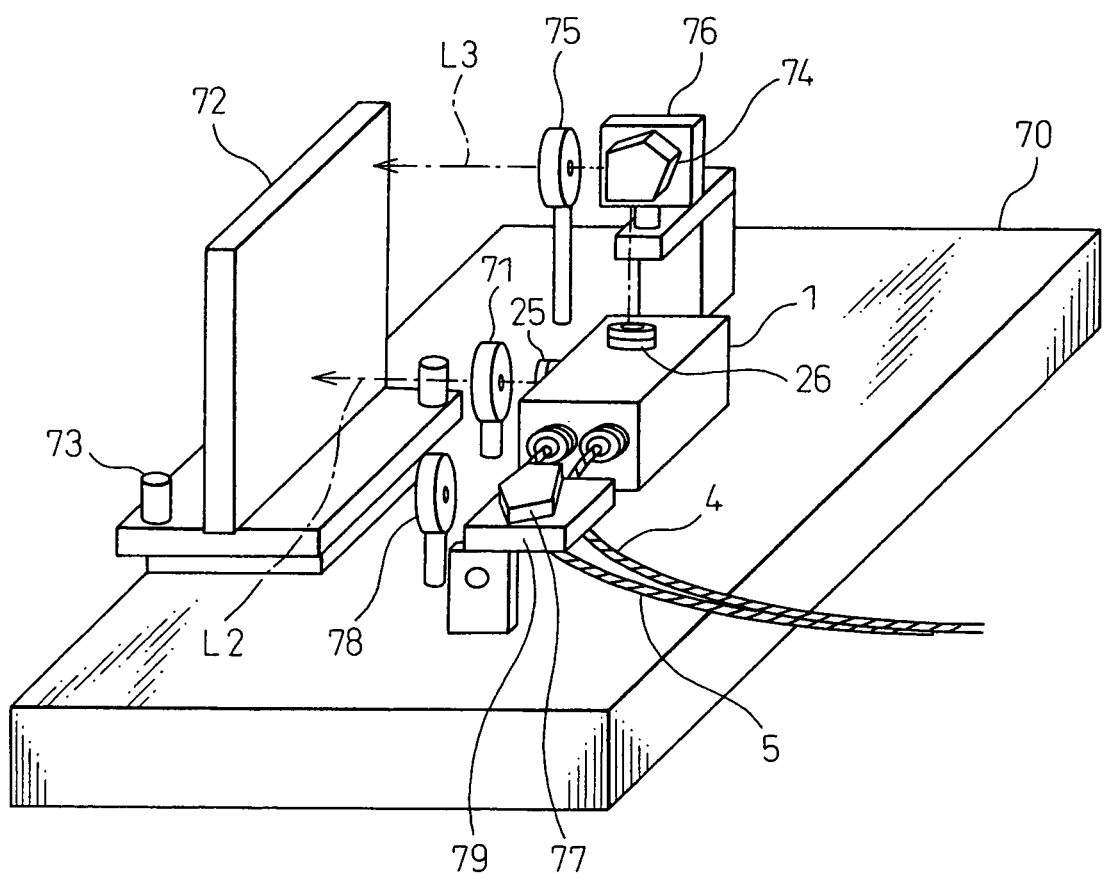
FIG. 11 is a diagram for explaining how the orthogonality between second axis beam L2 and third axis beam L3 is adjusted.

FIG. 11 is a diagram explaining how the orthogonality between second axis beam L2 and third axis beam L3 is adjusted.

First, optical interference unit 1 is placed on adjustment table 70 by orienting its second axis direction toward plane mirror 72.

Then, third axis beam L3 as constantly emitted light is introduced into penta prism 74, and the propagation direction of the beam is bent precisely by 90 degrees so that the beam emerges in a direction substantially parallel to the direction of second axis beam L2. Further, the beam is passed through hole 75, and the beam thus reduced in diameter is reflected by plane mirror 72 back to hole 75. Then, two-way tilt base 73 of plane mirror 72 is adjusted so that the position of the thus returned light coincides with the center position of hole 75.

Next, second axis beam L2 is emitted so that it passes through hole 71, and the beam whose diameter is reduced by passing through hole 71 is reflected by plane mirror 72. The reflected beam returns to hole 71. Then, two-element wedge prism 25 is adjusted so that the position of the returned beam coincides with the center position of hole 71.

Figure 12:
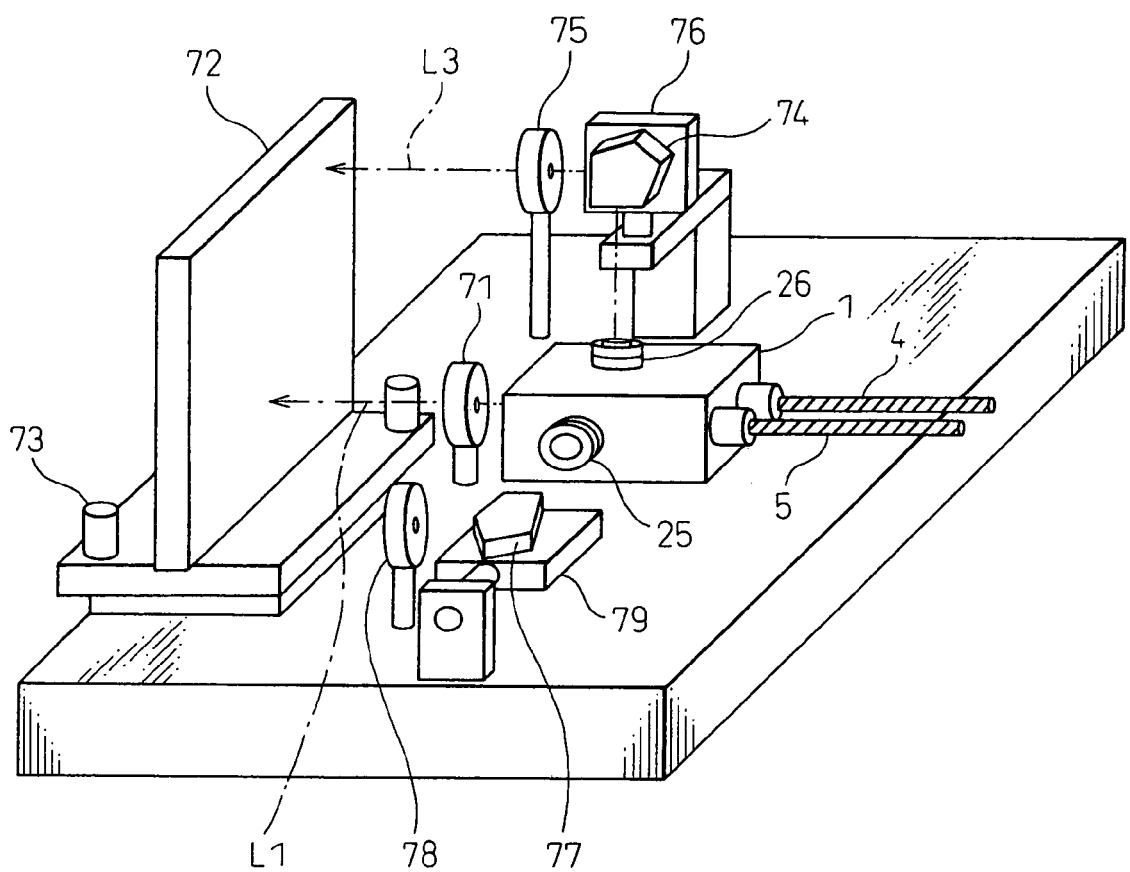
FIG. 12 is a diagram (part 1) for explaining how the orthogonality between first axis beam L1 and second axis beam L2 is adjusted.
Figure 13:
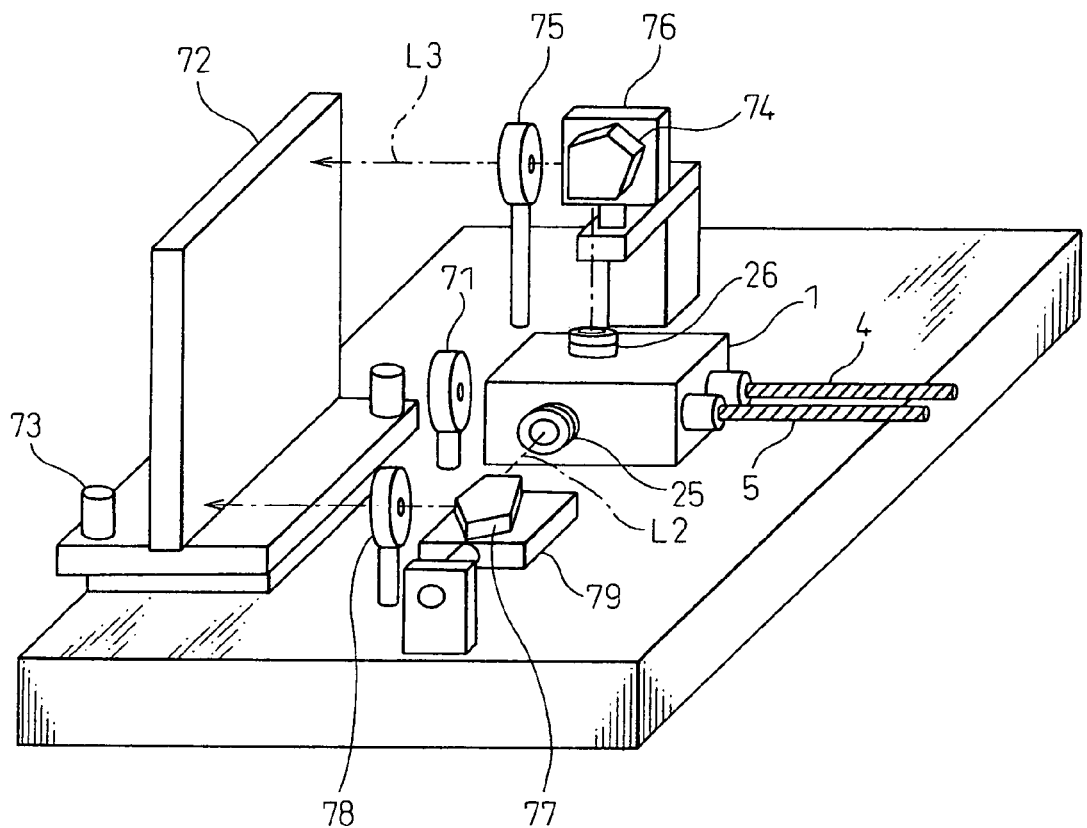
FIG. 13 is a diagram (part 2) for explaining how the orthogonality between first axis beam L1 and second axis beam L2 is adjusted.

FIGS. 12 and 13 are diagrams explaining how the orthogonality between first axis beam L1 and second axis beam L2 is adjusted. As shown, optical interference unit 1 is placed on adjustment table 70 by orienting its first axis direction toward plane mirror 72.

First, as shown in FIG. 12, first axis beam L1 is emitted as an output beam, and beam L1 is passed through hole 71 to reduce its diameter; the beam thus reduced in diameter is reflected by plane mirror 72 back to hole 71. Then, two-way tilt base 73 of plane mirror 72 is adjusted so that the position of the thus returned light coincides with the center position of hole 71.

Next, as shown in FIG. 13, the output beam is switched to second axis beam L2, and beam L2 is introduced into a penta prism 77 where the direction of the beam is bent precisely by 90 degrees so that the beam emerges in a direction substantially parallel to the direction of first axis beam L1. Further, the beam is passed through a hole 78, and the beam thus reduced in diameter is reflected by plane mirror 72 back to hole 78. Then, wedge prism 25 is adjusted so that the position of the thus returned light coincides with the center position of hole 78.

Here, since neither first axis beam L1 nor second axis beam L2 is constantly emitted light, the output beam is switched between first axis beam L1 and second axis beam L2 to adjust two-way tilt base 73 and wedge prism 25 in turn.

FIG. 14 and FIGS. 15A to 15C are diagrams showing alternative examples of the beam selecting unit shown in FIG. 4.

In optical interference unit 1 shown in FIG. 4, beam selecting unit 50, 51 has been employed that comprises half-wave plate 50 which rotates the polarization direction of the reflected beam through 90 degrees, and moving mechanism 51 capable of moving half-wave plate 50 between a position located in the light path of the reflected beam and a position that does not block the light path. However, the beam selecting unit is not limited to this particular configuration, but can be implemented in various configurations such as shown in FIG. 14 and FIGS. 15A to 15C, for example.

Figure 14:
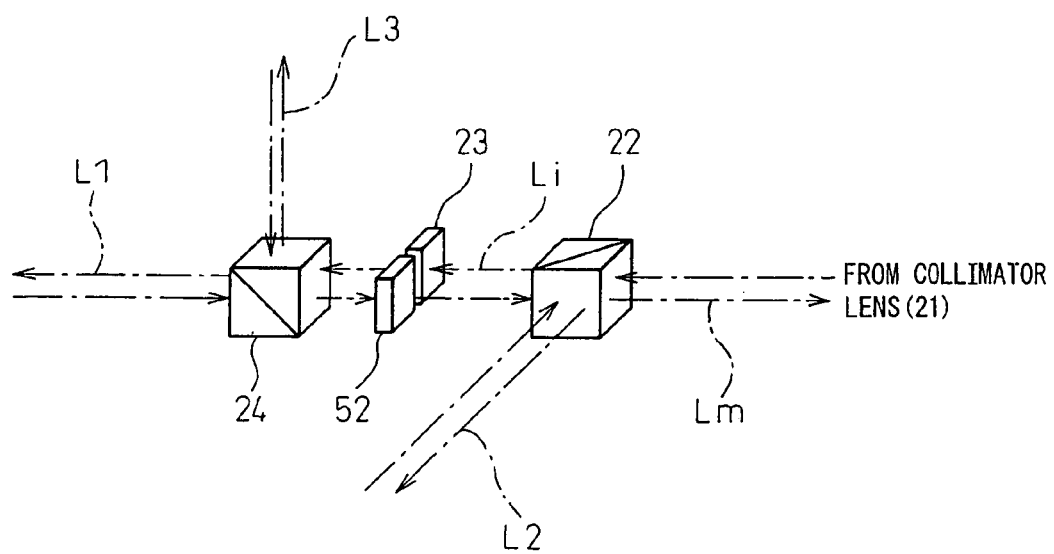
FIG. 14 is a diagram showing the configuration of a beam selecting unit according to a second embodiment.

For example, in the configuration shown in FIG. 14, the beam selecting unit is implemented using an electro-optical device 52, such as a liquid crystal optical device, that can be switched so as to rotate or not rotate the polarization direction of the laser beam passing therethrough through 90 degree, depending on the voltage applied to it.

In the configuration shown in FIG. 15, the beam splitter 22 is constructed as a non-polarization beam slitter, and the beam splitter 24 as a polarization beam splitter, while the beam selecting unit is constructed as a polarizer provided in the light path of the reflected beam of first axis beam L1 and the reflected beam of third axis beam L3 both exiting the beam splitter 24 in the reverse direction to the propagation direction of beam Li. By changing the polarization direction of the polarizer by 90 degrees, the beam selecting unit allows either the reflected beam of first axis beam L1 or the reflected beam of third axis beam L3 to pass through the polarizer and to enter beam splitter 22.

Here, a polarizer may be provided that polarizes second axis beam L2 after reflection by non-polarization beam splitter 22 so that depending on which of the reflected beams of first axis beam L1 and third axis beam L3 is allowed to enter beam splitter 22, the second axis beam emerging from the polarizer has a polarization plane oriented at 90 degrees to the polarization plane of the reflected beam entering beam splitter 22.

More specifically, a polarizer may be provided that polarizes second axis beam L2 so that, when combined beam Lm is produced at non-polarization beam splitter 22 by combining either the reflected beam of first axis beam L1 or the reflected beam of third axis beam L3 with the reflected beam of second axis beam L2 reflected by measuring reflective unit 172 or first reference reflective unit 43, the polarization plane of the component relating to the reflected beam of second axis beam L2 contained in combined beam Lm is orthogonal to the polarization plane of the component relating to either the reflected beam of first axis beam L1 or the reflected beam of third axis beam L3 contained in combined beam Lm.

Then, the polarization direction of the polarizer for polarizing second axis beam L2 is changed according to which of the reflected beams of first axis beam L1 and third axis beam L3, is allowed to enter beam splitter 22.

Figure 15A:
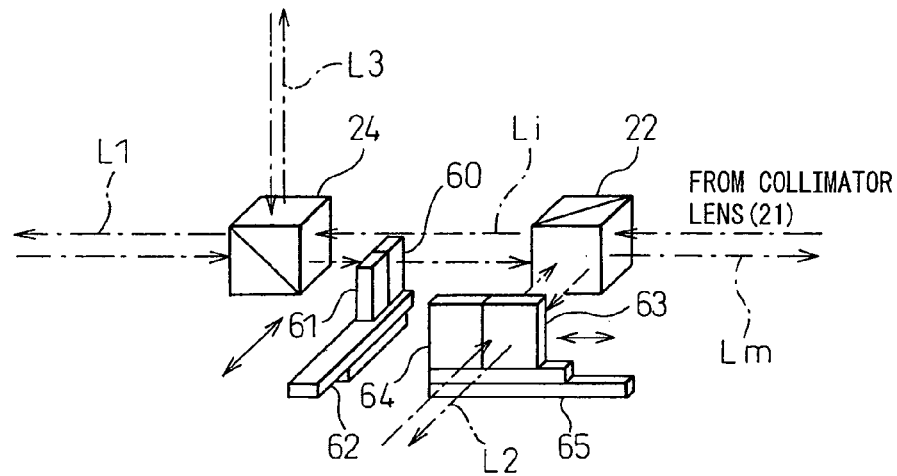
FIG. 15A is a diagram showing the configuration of a beam selecting unit according to a third embodiment.

To achieve this, in the configuration shown in FIG. 15A, the beam selecting unit comprises two polarizers 60 and 61 whose polarization directions are oriented at 90 degrees to each other, and a moving mechanism 62 for moving polarizer 60 or 61, whichever is selected, into the light path of the reflected beam of first axis beam L1 and the reflected beam of third axis beam L3 exiting the polarization beam splitter 24.

To match the above configuration, the beam selecting unit further comprises two polarizers 63 and 64 whose polarization directions are oriented at 90 degrees to each other, and a moving mechanism 65 for moving polarizers 63 and 64. Depending on which of the reflected beams of first axis beam L1 and third axis beam L3, is allowed to enter non-polarization beam splitter 22, moving mechanism 65 moves polarizer 63 or 64, whichever is appropriate, into the light path of second axis beam L2 in order to polarize second axis beam L2 in a direction orthogonal to the polarization direction of the reflected beam allowed to enter beam splitter 22.

Figure 15B:
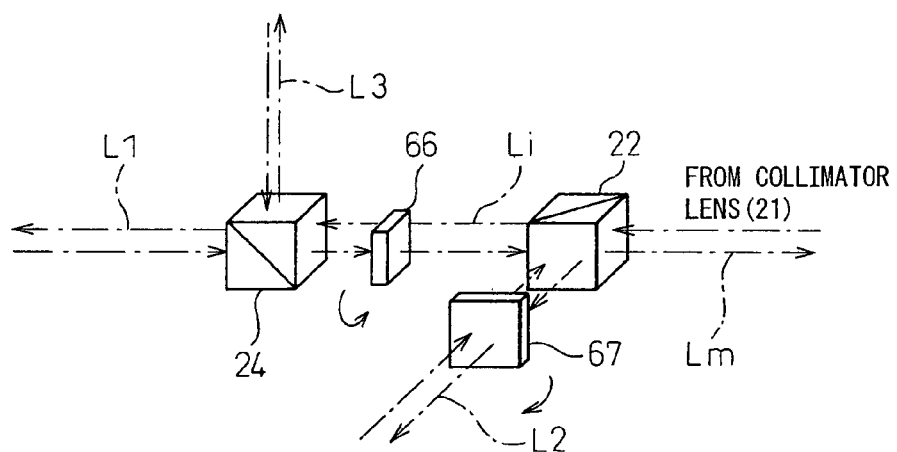
FIG. 15B is a diagram showing the configuration of a beam selecting unit according to a fourth embodiment.

On the other hand, in the configuration shown in FIG. 15B, the beam selecting unit is implemented as a rotatable polarizer 66 that is provided in the light path of the reflected beam of first axis beam L1 and the reflected beam of third axis beam L3 exiting the polarization beam splitter 24. Polarizer 66 is capable of changing its polarization direction by rotating 90 degrees about the axis of the light path. To match this configuration, a polarizer 97 capable of rotating 90 degrees about the axis of the light path of second axis beam L2 may be provided in that light path. Depending on which of the reflected beams of first axis beam L1 and third axis beam L3, is allowed to enter non-polarization beam splitter 22, polarizer 97 is rotated so as to polarize second axis beam L2 in a direction orthogonal to the polarization direction of the reflected beam allowed to enter beam splitter 22.

Figure 15C:
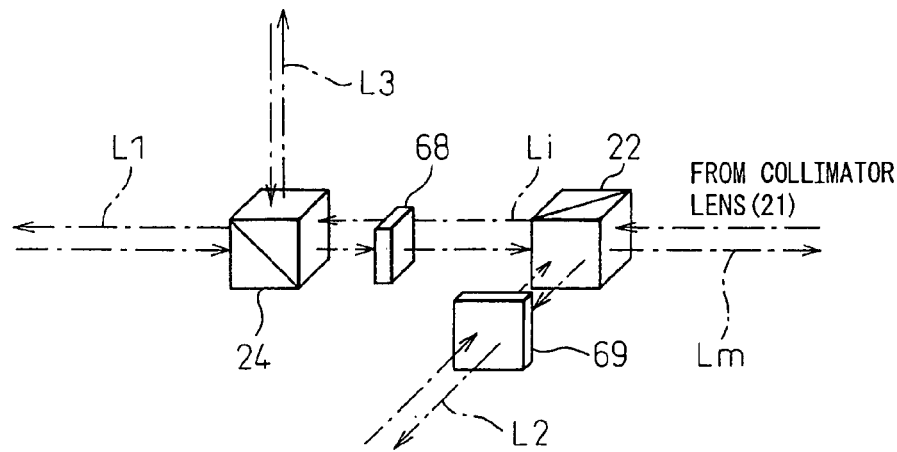
FIG. 15C is a diagram showing the configuration of a beam selecting unit according to a fifth embodiment.

In the configuration shown in FIG. 15C, the beam selecting unit is implemented as an electro-optical device 68, such as a liquid crystal photoelectric device, that is provided in the light path of the reflected beam of first axis beam L1 and the reflected beam of third axis beam L3 exiting the polarization beam splitter 24 and that is capable of changing its polarization direction according to the applied voltage. To match this configuration, an electro-optical device 69, such as a liquid crystal photoelectric device, capable of changing its polarization direction according to the applied voltage may be provided in the light path of second axis beam L2. Depending on which of the reflected beams of first axis beam L1 and third axis beam L3, is allowed to enter non-polarization beam splitter 22, electro-optical device 69 is operated so as to polarize second axis beam L2 in a direction orthogonal to the polarization direction of the reflected beam allowed to enter beam splitter 22.

The present invention can thus provide a laser interferometer that can easily adjust the orthogonality between the three orthogonal axis directions.

The present invention is applicable to a laser distance measuring apparatus which splits a laser beam into two parts, one directed to a reflective mirror (corner cube) mounted on an object to be measured and the other to a fixed reference corner cube, causes the two parts reflected back from the respective corner cubes to interfere with each other, and measures the distance of movement relative to the object by counting the number of resulting interference fringes which changes as the amount of the relative movement changes. The invention is particularly applicable to a laser distance measuring apparatus that measures errors in the amount of movement in each moving axis direction of a numerically controlled (NC) machine tool, as defined in ISO 230-2, JIS-B-6201-1990, etc.

While the preferred embodiments of the present invention have been described in detail above, it should be understood by those skilled in the art that various modifications and changes can be made by anyone skilled in the art, and that all of such modifications and changes that come within the range and purpose of the present invention fall within the scope of the present invention as defined by the appended claims.

DESCRIPTION OF REFERENCE NUMERALS

1 . . . INTERFERENCE OPTICAL UNIT
2 . . . POWER SUPPLY
3 . . . LASER LIGHT SOURCE
4 . . . POLARIZATION MAINTAINING FIBER
5 . . . LIGHT GUIDE
6 . . . OPTICAL-TO-ELECTRICAL CONVERTING UNIT
8 . . . COUNTER
9 . . . COMPUTING UNIT
22 . . . FIRST POLARIZATION BEAM SPLITTER
23, 50 . . . HALF-WAVE PLATE
24 . . . SECOND POLARIZATION BEAM SPLITTER
30 . . . RECEIVER UNIT
41 . . . SECOND REFERENCE REFLECTIVE UNIT
43 . . . FIRST REFERENCE REFLECTIVE-UNIT
171, 172, 173 . . . MEASURING REFLECTIVE UNIT
L1 . . . FIRST AXIS BEAM
L2 . . . SECOND AXIS BEAM
L3 . . . THIRD AXIS BEAM

The invention claimed is:

1. A laser distance measuring apparatus of the type which splits a laser beam into a measuring beam directed to a measuring reflector and a reference beam, generates interference light through interference between said measuring beam returned by reflection and said reference beam, and a counter to measures a distance of movement relative to said measuring reflector by counting changes in interference fringes formed by said interference light, the apparatus comprising:
   a first beam splitter which splits said laser beam into a first beam and a second beam;
   a second beam splitter which splits said second beam into a third beam and a fourth beam, the apparatus being so deployed that reflected beams, produced by reflection of said third and fourth beams and incident from directions reverse to the directions of said third and fourth beams, exit in a reverse direction to the direction of said second beam;
   a first reference reflector that, when either one of said third and fourth beams is emitted as said measuring beam, is moved by a first mover into a light path of said first beam and reflects said first beam incident thereon into a direction of incidence of said first beam, thereby producing said reference beam;
   a second reference reflector that, when said first beam is emitted as said measuring beam, is moved by a second mover into a light path of said third beam and reflects said third beam incident thereon into the direction of incidence;
   a beam switch further comprising a beam selector and a third mover, that, by movement of said beam selector between a first in-beam position and a second out-of-beam position, from among said reflected beams produced by reflection of said third and fourth beams and caused to exit said second beam splitter in the reverse direction to the direction of said second beam, selects one of said reflected beams to be combined in said first beam splitter with a reflected beam produced by reflection of said first beam and incident on said first beam splitter from a reverse direction to the direction of said first beam; and
   a light detector that generates an electrical signal corresponding to interference fringes formed by the interference light that is generated through interference between said beam selected by said beam switch and said reflected beam produced by reflection of said first beam; wherein
   said first and second beam splitters comprise respective polarization beam splitters; wherein
   said laser distance measuring apparatus comprises a first polarization rotator to rotate the direction of polarization of said second beam through 45 degrees, said first polarization rotator being located between said beam splitters; and wherein
   said beam selector comprises a second polarization rotator so that the direction of polarization of each of said reflected beams caused to exit said second beam splitter in the reverse direction to the direction of said second beam is rotated or not rotated through 90 degrees.

2. The laser distance measuring apparatus as claimed in claim 1, wherein said second polarization rotator comprises a half-wave plate movable between a position located in a light path and a position that does not block said light path.

3. The laser distance measuring apparatus as claimed in claim 1, wherein said second polarization rotator comprises an electro-optical device so that the laser beam passing therethrough is rotated or not rotated through 90 degrees, depending on an applied voltage.

4. The laser distance measuring apparatus as claimed in claim 1, wherein
   said second beam splitter is a polarization beam splitter, and
   said beam switch includes a polarization rotator which is located in the light path of said reflected beams produced by reflection of said third and fourth beams and caused to exit said second beam splitter in the reverse direction to the direction of said second beam, and whose direction of polarization is changed so as to allow only a selected one of said reflected beams to pass therethrough.

5. The laser distance measuring apparatus as claimed in claim 4, wherein said polarization rotator comprises a plurality of polarizers having difference directions of polarization and a mechanism movable, one at a time, into said light path.

6. The laser distance measuring apparatus as claimed in claim 4, wherein said polarization rotator comprises a polarizer whose direction of polarization can be changed by rotating about said light path as a rotation axis.

7. The laser distance measuring apparatus as claimed in claim 4, wherein said polarization rotator comprises an electro-optical device whose direction of polarization can be changed according to an applied voltage.

8. The laser distance measuring apparatus as claimed in claim 1, wherein said first, third, and fourth beams are each emitted as said measuring beam in a corresponding one of three axis directions and, of these beams, said fourth beam is constantly emitted.

9. A laser distance measuring apparatus of the type which splits a laser beam into a measuring beam directed to a measuring reflector and a reference beam, generates interference light through interference between said measuring beam returned by reflection and said reference beam, and a counter to measures a distance of movement relative to said measuring reflector by counting changes in interference fringes formed by said interference light, the apparatus comprising:

a first beam means for splitting said laser beam into a first beam and a second beam;

a second beam means for splitting said second beam into a third beam and a fourth beam, and for causing reflected beams, produced by reflection of said third and fourth beams and incident from reverse directions to the directions of said third and fourth beams, to exit in a reverse direction to the direction of said second beam;

a first reference reflective means for producing said reference beam unit which, when either one of said third and fourth beams is emitted as said measuring beam, moves into a light path of said first beam and reflects said first beam incident thereon into a direction of incidence;

a second reference reflective means for producing said reference beam unit which, when said first beam is emitted as said measuring beam, moves into a light path of said third beam and reflects said third beam incident thereon into the direction of incidence;

a means for beam selecting which, from among said reflected beams produced by reflection of said third and fourth beams and caused to exit said second beam splitter in the reverse direction to the direction of said second beam, selects a beam to be combined in said first beam splitter with a reflected beam produced by reflection of said first beam and incident on said first beam splitter from a reverse direction to the direction of said first beam; and a means for light detecting which generates an electrical signal that matches the interference fringes formed by the interference light that is generated through interference between said beam selected by said beam selecting unit and said reflected beam produced by reflection of said first beam; wherein said first and second beam splitters comprise respective polarization beam splitters; wherein said laser distance measuring apparatus comprises a first polarization rotator to rotate the direction of polarization of said second beam through 45 degrees, said first polarization rotator being located between said beam splitters; and wherein said beam selector comprises a second polarization rotator so that the direction of polarization of each of said reflected beams caused to exit said second beam splitter in the reverse direction to the direction of said second beam is rotated or not rotated through 90 degrees.

10. The laser distance measuring apparatus as in claim 9, wherein said first beam means for splitting said laser beam and said second beam means for splitting said laser beam include means for polarization beam splitting further comprising a first polarization means for rotating the direction of polarization of said second beam through 45 degrees located between said first beam means for splitting said laser beam and said second beam means for splitting said laser beam, and wherein said means for beam selecting is constructed as a second polarization adjusting means that can be switched so that the direction of polarization of each of said reflected beams caused to exit said second beam splitter in the reverse direction to the direction of said second beam is rotated or not rotated through 90 degrees.

11. The laser distance measuring apparatus as claimed in claim 10, wherein said second polarization adjusting means comprises a half-wave plate movable between a position located in a light path and a position that does not block said light path.

12. The laser distance measuring apparatus as claimed in claim 10, wherein said second polarization adjusting means comprises an electro-optical means for switching so that the laser beam passing therethrough is rotated or not rotated through 90 degrees, depending on an applied voltage.

13. The laser distance measuring apparatus as claimed in claim 9, wherein said second beam means for splitting is a polarization beam splitter, and said means for beam selecting is a polarizing unit which is provided in the light path of said reflected beams produced by reflection of said third and fourth beams and caused to exit said second beam splitter in the reverse direction to the direction of said second beam, and whose direction of polarization is changed so as to allow only a selected one of said reflected beams to pass therethrough.

14. The laser distance measuring apparatus as claimed in claim 13, wherein said polarizing unit comprises a plurality of polarizers having difference directions of polarization and movable, one at a time, into said light path.

15. The laser distance measuring apparatus as claimed in claim 13, wherein said polarizing unit comprises a polarizer whose direction of polarization can be changed by rotating about said light path as a rotation axis.

16. The laser distance measuring apparatus as claimed in claim 13, wherein said polarizing unit comprises an electro-optical device whose direction of polarization can be changed according to an applied voltage.

17. The laser distance measuring apparatus as claimed in claim 9, wherein said first, third, and fourth beams are each emitted as said measuring beam in a corresponding one of three axis directions and, of these beams, means for emitting said fourth beam constantly.

* * * * *